US006880073B2

United States Patent
Arimilli et al.

(10) Patent No.: US 6,880,073 B2
(45) Date of Patent: *Apr. 12, 2005

(54) SPECULATIVE EXECUTION OF INSTRUCTIONS AND PROCESSES BEFORE COMPLETION OF PRECEDING BARRIER OPERATIONS

(75) Inventors: Ravi Kumar Arimilli, Austin, TX (US); John Steven Dodson, Pflugerville, TX (US); Guy Lynn Guthrie, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 748 days.

This patent is subject to a terminal disclaimer.

(21) Appl. No.: 09/753,053

(22) Filed: Dec. 28, 2000

(65) Prior Publication Data

US 2002/0087849 A1 Jul. 4, 2002

(51) Int. Cl.$^7$ .............................................. G06F 9/00
(52) U.S. Cl. ...................................... 712/245; 712/235
(58) Field of Search ................................. 712/235, 245, 712/246

(56) References Cited

U.S. PATENT DOCUMENTS

| | | | | |
|---|---|---|---|---|
| 5,615,350 A | * | 3/1997 | Hesson et al. .............. | 712/218 |
| 5,822,575 A | * | 10/1998 | Tran ........................... | 712/239 |
| 6,216,200 B1 | * | 4/2001 | Yeager ....................... | 711/100 |
| 6,286,095 B1 | * | 9/2001 | Morris et al. ............... | 712/216 |
| 6,415,380 B1 | * | 7/2002 | Sato ........................... | 712/217 |
| 6,606,702 B1 | * | 8/2003 | Guthrie et al. .............. | 712/218 |

* cited by examiner

Primary Examiner—Eddie Chan
Assistant Examiner—Charles Harkness
(74) Attorney, Agent, or Firm—Casimer K. Salys; Dillon & Yudell LLP

(57) ABSTRACT

Described is a data processing system and processor that provides full multiprocessor speculation by which all instructions subsequent to barrier operations in a instruction sequence are speculatively executed before the barrier operation completes on the system bus. The processor comprises a load/store unit (LSU) with a barrier operation (BOP) controller that permits load instructions subsequent to syncs in an instruction sequence to be speculatively issued prior to the return of the sync acknowledgment. Data returned is immediately forwarded to the processor's execution units. The returned data and results of subsequent operations are held temporarily in rename registers. A multiprocessor speculation flag is set in the corresponding rename registers to indicate that the value is "barrier" speculative. When a barrier acknowledge is received by the BOP controller, the flag(s) of the corresponding rename register(s) are reset.

26 Claims, 5 Drawing Sheets

| No. | Flag | Register rename entries (values) | GPR # |
|---|---|---|---|
| 1 | 0 | | XXXX0 |
| 2 | 1 | | XXX11 |
| 3 | 1 | | XXX10 |
| . | | | |
| . | | | |
| . | | | |
| 80 | 0 | | XX1XX |

Fig. 4

SPECULATIVE EXECUTION OF INSTRUCTIONS AND PROCESSES BEFORE COMPLETION OF PRECEDING BARRIER OPERATIONS

BACKGROUND OF THE INVENTION

1. Technical Field

The present invention relates in general to data processing systems and in particular to instruction processing in multiprocessor data processing systems. Still more particularly, the present invention relates to a method and processor architecture for improving processing efficiency by enabling full, un-throttled execution of instructions beyond barrier operations.

2. Description of the Related Art

The need for faster and more efficient processing of computer instructions has typically been at the forefront of development in processors and data processing systems. Improved processing speeds led to development of processors with weakly consistent processor architectures that permit some amounts of speculation (such as branch speculation) and out-of-order execution of instructions. With out-of-order execution and speculation, the processor has to be provide with some way of ensuring that correct dependencies in processes and/or data are maintained. The processor typically assigns a series of instructions (e.g., load, store, and compare instructions) to a group when no dependencies exist between instructions within that group. Instructions within a group can be executed in parallel or out-of-order (i.e., later instructions executed before earlier instructions). However, due to possible data dependencies between groups, instructions in each group are executed in program order with respect to instructions in a next group to ensure correct processing results.

State-of-the-art superscalar processors provide a branch prediction mechanism by which branch instructions are permitted to be speculatively executed and later resolved. A superscalar processor may comprise, for example, an instruction cache for storing instructions, one or more execution units for executing sequential instructions, branch prediction and branch resolution logic for processing branch instructions, instruction sequencing logic for routing instructions to the various execution units, and registers for storing operands and result data.

When initially executed, conditional branch instructions are classified as unresolved. In order to minimize execution stalls, some processors speculatively execute unresolved branch instructions by predicting whether or not the indicated branch will be taken. Utilizing the result of the prediction, the instruction sequencing logic is then able to speculatively fetch instructions within a target execution path prior to the resolution of the branch. Presently, the more accurate branch prediction methodologies, such as branch history tables, yield correct predictions more than 92% of the time, which in terms of overall processor efficiency is widely considered to provide a significant improvement.

Typically, however, when a processor begins executing instructions within a speculatively predicted path (i.e., target or in-line path), processing of instructions within that path can only be completed up to the first barrier operation in the instruction sequence, and the processor waits until an acknowledgment is received for the barrier operation before continuing to process the instruction sequence down the branch path.

In multiprocessor systems, the correct completion of operations within code or instructions executing on a first processor may be dependent on operations on a second interconnected processor. For example, with load and store instructions executed by a load/store unit (LSU) of a first processor, a previous instruction that stores a value to a particular location must be executed before a later instruction that loads the value of that location.

Barrier instructions are placed within the instruction sequence to separate groups of instructions and ensure that all instructions within a first group are fully executed (i.e., the corresponding operations and results are visible to all other processors) before any instruction within a subsequent group is executed. The instruction set architecture (ISA) supported by most commercially available processors includes a barrier instruction, which initiates a barrier operation on the system. In the PowerPC™ family of processors, for example, one barrier instruction that is employed to establish a processing boundary is the "sync" instruction, and the corresponding transaction on the system bus is called a synchronization operation (sync op). Other barrier instructions exist within the instruction set, but synch ops will be utilized generally within the present document to refer to global barrier instructions.

Barrier instructions are particularly necessary when the multiprocessor system includes superscalar processors supporting out-of-order instruction execution and weak memory consistency. However, there are implied barrier instructions utilized within in-order processor systems.

In slower processors, which operate at, for example, 100 MHz, each barrier instruction, such as a sync op, may require approximately 10 processor cycles to complete. In commercial server workloads, the sync ops typically degrade processing efficiency by approximately 5 percent. With faster processors, however, such as those operating in the Ghz range, a sync may complete in approximately 200 processor cycles and degrades processing efficiency by approximately 10 percent. Thus, syncs place a significant burden on processor efficiency, particularly because, in typical commercial software, syncs regularly occur every 500–1000 instructions. Each occurrence of a sync causes processors in a data processing system to be throttled for a lengthy time while the issuing processor waits on the sync operation to complete.

The inherent performance limitations of throttling the processor after each occurrence of a barrier instruction becomes even more acute with newer, high speed processor architectures, which have deep execution pipelines, large instruction fetch latencies, and processes instructions with a high level of accuracy. Thus, throttling a processor from continuing along an execution path because of a barrier operation significantly limits processor efficiency.

The present invention recognizes that it would therefore be desirable to provide a method and processor architecture for enabling full processor speculation by executing all instructions beyond barrier operations to reduce processor throttling while waiting on a sync ack and thereby increase processor speed and efficiency.

SUMMARY OF THE INVENTION

Described is a data processing system and processor that provides full multiprocessor speculation by which all instructions subsequent to barrier operations in a instruction sequence are speculatively executed while the barrier operation is executing on the system bus (i.e., before the barrier operation completes and an acknowledgment is received at the issuing processor).

The processor comprises a the load/store unit (LSU) having a barrier operation (BOP) controller that is coupled to and interacts with the LSU's load request queue (LRQ) and store/barrier queue. The BOP controller permits load instructions subsequent to syncs in an instruction sequence to be speculatively issued by the LRQ prior to the return of the sync acknowledgment. To speculatively issue load requests, the barrier operation controller maintains a multiprocessor speculation (MS) flag in each entry of the LRQ. Load data returned by the speculative load request is immediately forwarded to the processor's execution units before the corresponding sync ack arrives and is utilized by the speculative processes associated with the subsequent instructions.

Thus, instructions following an incomplete barrier operation, such as loads/stores and other instructions, which may utilize the returned data, are executed without throttling the processor by first determining if the barrier operation completes successfully. The processor thus continues processing instructions as if no speculation has occurred. The MS flag remains set in the LRQ while the processor continues executing instructions. The MS flag is reset only when the sync ack is received. Because the speculative issuance of loads/stores beyond a barrier instruction have correct dependencies in over 99% of the times in high frequency processors, the processor continues to operate smoothly with an efficiency gain of up to 100 processor cycles when operating with full speculation.

In the preferred embodiment, the returned data and results of subsequent operations are held temporarily in the rename registers. A multiprocessor speculation flag is set in the corresponding rename registers to indicate that the value is speculative. When a barrier acknowledge is received by the BOP controller, the BOP controller messages logic affiliated with the processor's registers, which then resets the flag(s) of the corresponding rename register(s). The rename register is then characterized as the general purpose register (GPR) or floating point register (FPR) to which it is assigned.

In one preferred embodiment, the internal instruction set architecture (IISA) is provided one or more additional bits for utilization as the speculative flag(s). However, another preferred embodiment utilizes internal functionality of the associated queues to provide the additional bits that tag the particular instruction when the instruction is within the queue. In either case, as with the LRQ, the bit is reset when the sync ack returns.

In another embodiment, the invention permits embedded speculation by allowing speculative loads/stores and branch prediction to continue within the first and embedded instruction sequences.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a table representation of rename registers utilized in accordance with one embodiment of the present invention.

DETAILED DESCRIPTION OF AN ILLUSTRATIVE EMBODIMENT

Figure 1:
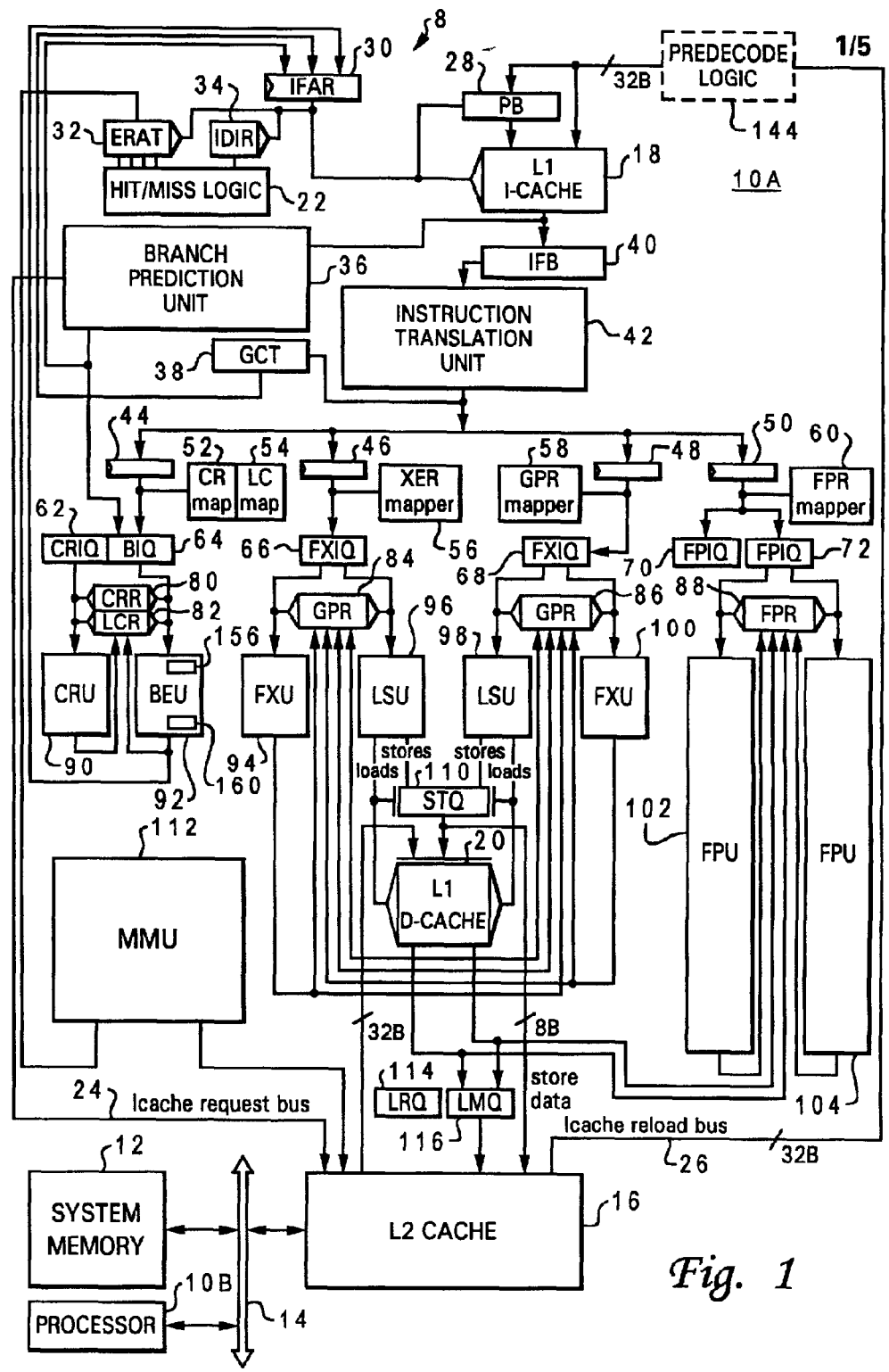
FIG. 1 depicts a high level block diagram of a processor and multiprocessor data processing system in which a preferred embodiment of the present invention may be advantageously implemented.

With reference now to the figures, and in particular with reference to FIG. 1, there is illustrated a high level block diagram of a processor within a multiprocessor data processing system in accordance with the present invention. As depicted, data processing system 8 includes two processors 10A and 10B (although additional processors are possible). Processors 10A, 10B preferably comprises one of the PowerPC™ line of microprocessors available from International Business Machines Corporation. Processors 10A, 10B are preferably superscalar with full out-of-order execution. Those skilled in the art will appreciate that other suitable processors can be utilized.

As illustrated, data processing system 8 further includes system memory 12, which like processor 10B is interconnected with processor 10A via interconnect (or system bus) 14. Interconnect 14, which can comprise one or more buses or a cross-point switch, serves as a conduit for communication transactions between processors 10A, 10B, system memory 12, and other devices associated with data processing system 8. Each device coupled to interconnect 14 preferably snoops all communication transactions on interconnect 14.

Processor 10A is utilized for processing instructions and data in accordance with the present invention. Processor 10A provides full-multiprocessor speculation by executing instructions (load/stores and other instructions) following a barrier instruction in the instruction sequence before the corresponding barrier operation completes on the system bus and an acknowledgment is received.

Processor 10A comprises a single integrated circuit superscalar processor, which, as discussed further below, includes various execution units, registers, buffers, memories, and other functional units that are all formed by integrated circuitry. Processor 10A also includes an on-chip multi-level cache hierarchy including a unified level two (L2) cache 16 and bifurcated level one (L1) instruction (I) and data (D) caches 18 and 20, respectively. As is well-known to those skilled in the art, caches 16, 18 and 20 provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which in accordance with the present invention includes logic 160 that provides continuous speculative fetch and execution of instructions along a predicted branch path beyond barrier operations.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache 18 via I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts an outcome of conditional branch instructions, if any. Such prediction can be performed by any known or future developed static or dynamic branch prediction methodology or, alternatively, can entail simply always selecting the next sequential address following the branch instruction (which is not truly branch prediction). In the preferred embodiment, branch prediction methodology utilizes branch history tables to provide greater than 92% accuracy with branch prediction for commercial server workloads.

IFB 40 temporarily buffers the cache line of instructions received from L1 I-cache 18 until the cache line of instructions can be translated by instruction translation unit (ITU) 42. In the illustrated embodiment of processor 10A, ITU 42 translates instructions from user instruction set architecture (UISA) instructions into a possibly different number of internal ISA (IISA) instructions that are directly executable by the execution units of processor 10A. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be dispatched and executed out-of-order with respect to one another.

Each instruction group is separated by a barrier operation (or sync) as described in further detail below. Global completion table 38 tracks each instruction group for which execution has yet to be completed by at least one associated EA, which is preferably the EA of the oldest instruction in the instruction group.

Following UISA-to-IISA instruction translation, instructions are dispatched to one of latches 44, 46, 48 and 50, possibly out-of-order, based upon instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more rename registers by the appropriate one of CR mapper 52, link and count (LC) register mapper 54, exception register (XER) mapper 56, general-purpose register (GPR) mapper 58, and floating-point register (FPR) mapper 60. Utilization of the rename registers within the preferred embodiment of the invention is described below with reference to FIG. 4.

Returning now to FIG. 1, and particularly to processor 10A, the dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72.

From issue queues 62, 64, 66, 68, 70 and 72, instructions can be issued opportunistically to the execution units of processor 10 for execution without specific regard for data dependencies and anti-dependencies. The instructions, however, are maintained in issue queues 62–72 until execution of the instructions is complete and the result data, if any, are written back to the rename registers associated with the GPRs 84, 86 in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address.

General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98. After an execution unit finishes execution of an instruction, the execution notifies GCT 38, which schedules completion of instructions in program order.

The present invention is described with reference to the above data processing system 100 and processor 10A but may be implemented in many other types of data processing system and processor architecture. The reference herein to a particular system architecture is therefore not meant to be limiting on the invention.

Figure 2:
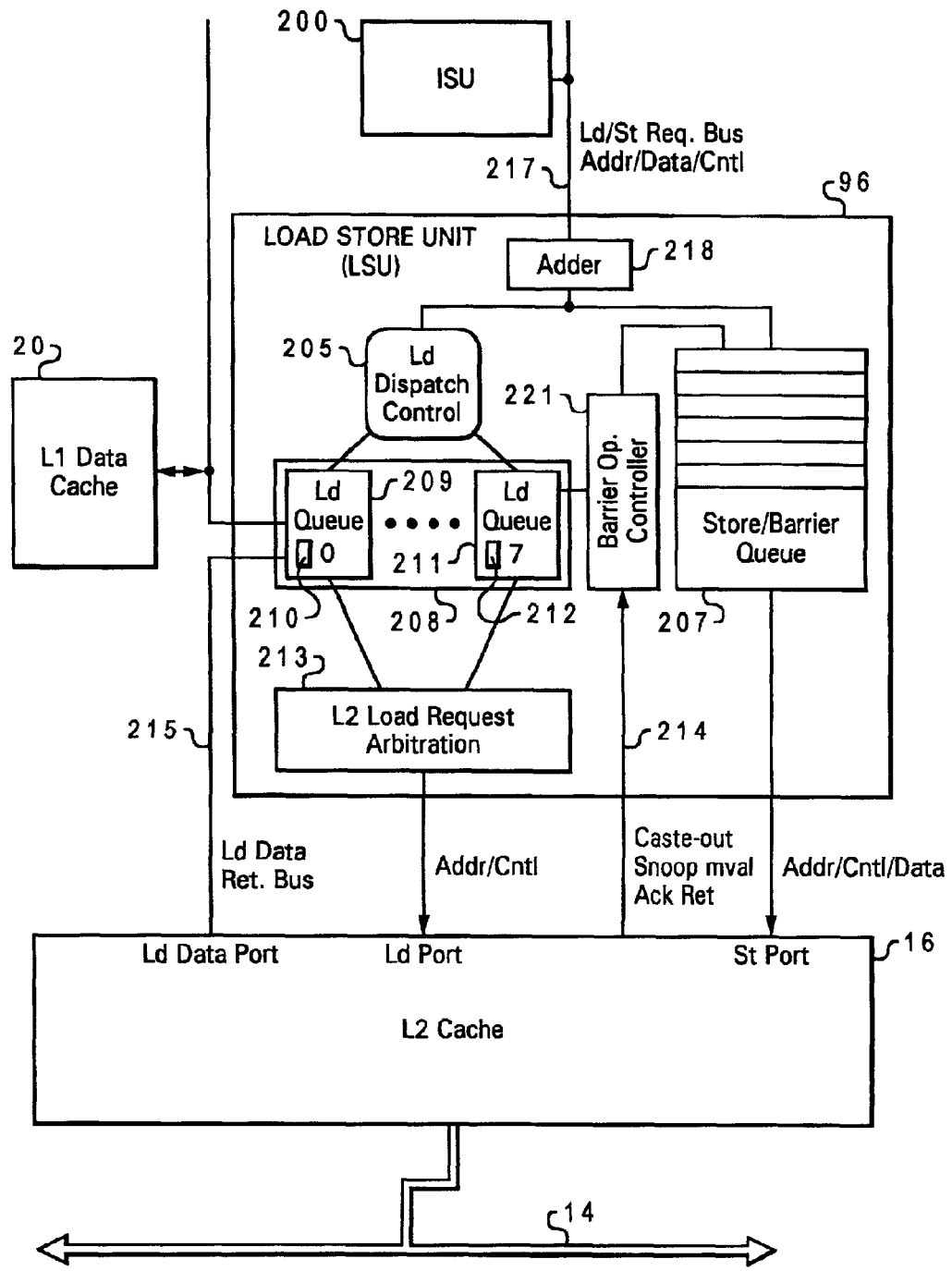
FIG. 2 is a block diagram of a preferred embodiment of a Load/Store Unit (LSU) utilized in accordance with the present invention.

Referring now to FIG. 2, there is illustrated a preferred embodiment of LSU 96, 98 of FIG. 1 in accordance with the present invention. LSU 96, 98 is one of the execution units within the processor core of processor 10A illustrated in FIG. 1. LSU 96, 98 typically executes load instructions, which load data from L1 data cache 20, L2 cache 16, or memory 12 into selected general purpose registers (GPRS) 84, 86, GPR rename buffers, fixed purpose registers (FPRS)

88 or FPR rename buffers in the processor core. LSU 96, 98 also executes store instructions, which store data from a selected one of GPRs, GPR rename buffers, FPRs, or FPR rename buffers to memory. The present invention extends the functionality of the LSU during loading and storing of data to allow speculative loading and storing beyond a sync in the instruction sequence as well as speculative execution of other instruction types following the sync that may utilize the speculatively loaded (or stored) data. In the preferred embodiment, the speculatively loaded data and results from the subsequent speculatively executed instructions are stored within GPR and FPR rename registers of processor 10A until the data is determined to exhibit correct dependencies.

Returning now to FIG. 2, LSU 96, 98 includes adder 218, which receives load/store instructions from an instruction sequencing unit (ISU) 200 via load/store request bus 217. ISU 200 represents a collection of various components illustrated in FIG. 1, which collectively provides instructions from the instruction cache 18, L2 cache 16 or memory 12 to the other execution units of processor 10A of FIG. 1. The load/store instructions may be received in program order, i.e., in the sequence in which they were placed by the computer or programmer. Adder 218 calculates the target effective addresses of load and store instructions in the instruction stream. Adder 218 then forwards the target addresses for load instructions to load dispatch control unit 205 and forwards sync instructions and target addresses for store instructions to store/barrier queue 207 (illustrated as STQ 110 outside of LSU 96,98 in FIG. 1).

Load dispatch control unit 205 places the load instructions into an N entry (0 to N–1) Load Request Queue (LRQ) 208. For simplicity an 8 entry (0–7) LRQ 208 is illustrated. Load register 0 209 through load register 7 211 hold the load instructions and are further coupled to L2 load request arbitration unit 213, which determines the order for issuing the load requests out to L1 data cache 20 or L2 cache 16. In the preferred embodiment, as illustrated, each load register has an affiliated multiprocessor speculation (MS) flag that indicates whether or not the load request is issued speculatively (i.e., subject to a previous sync operation). Thus, load register 0 209 has an affiliated MS flag 210, and load register 7 211 has an affiliated MS flag 212. Load requests that are subsequent to a sync in program order can be issued speculatively before the sync op completes on the system bus 14 when tracked by an affiliated MS Flag. In an alternate embodiment, where LRQ 208 issues load requests to L1 data cache 26 or L2 cache 30 sequentially, LRQ 208 may have a single MS flag and set the MS flag for the first load request issued prior to receipt of a sync ack.

In the preferred embodiment, LSU includes a barrier operation (BOP) controller 221, which is coupled to both LRQ 208 and store/barrier queue 207. BOP controller 221 is comprised of hardware logic by which the setting of the MS flag and other operations, which effectuate the speculative loads and subsequent execution of instructions according to the invention, are completed. BOP controller 201 is coupled to L2 cache 16 via ack bus 214 by which sync acknowledgments are transmitted back to LSU 96.

As described, BOP controller 221 maintains the MS flags, which mark speculative loads executed out-of-order with respect to previous syncs. BOP controller 221 monitors the store/barrier queue 207 to determine when a sync operation, which is sequentially ahead of issued load instruction(s) in the instruction sequence, has not been completed. MS flags 210, 212 may be latches, which are set by BOP controller 221. MS flags 210, 212 may also be registers that include a single bit or group of bits depending on the desired functionality, as will become clear later.

MS flags 210, 212 may be in "set" state when a load instruction is dependent on a previous sync, i.e., a speculative load, or in "reset" state when a load instruction is not dependent on a previous sync or the sync ack has been received at LSU 96. When implemented as a single bit, MS flags 210, 212 have a first set value (e.g. "1"), which represents to the LSU that the load is a speculative load, i.e., subject to receipt of a sync ack. MS flags 210, 212 also have a second value (e.g. "0") that represents to LSU 96 that execution of the load does not depend on the receipt of a sync ack. BOP controller 221 and LRQ 208 control the issuance of the speculative loads and set the MS flags.

Transfer of instructions and data between the various components of FIG. 2 are completed with interconnect buses as shown. Thus, for example, both load dispatch control unit 205 and store/barrier queue 207 receive load and store/barrier instructions, respectively, from adder 218 via a core load/store request bus 217, and data is returned from L2 cache 16 via load data return bus 215. Further, system bus 14 provides a connection between L2 cache 16 and the external system components as provided in FIG. 1. Although LSU 96 is depicted in FIG. 2 as having specific components, it is understood that additional components may be included within LSU including, for example, an address translation buffer. The presented figure is utilized for illustrative purposes only and is not meant to be limiting on the invention.

The specific features and functionality of the LSU architecture are provided in the following commonly owned, cross-referenced, and co-pending patent applications: Ser. No. 09/588,605 entitled "Multiprocessor Speculation Mechanism for Efficiently Managing Multiple Barrier Operations"; Ser. No. 09/588,509 entitled "Mechanism for Folding Storage Barrier Operations in a Multiprocessor System"; Ser. No. 09/588,483 entitled "Multi-level Multiprocessor Speculation Mechanism"; and Ser. No. 09/588, 507 entitled "System and Method for Providing Multiprocessor Speculation Within a Speculative Branch Path". The relevant content of the above-referenced applications is incorporated herein by reference.

Unlike the architecture of the co-pending references, however, the present invention provides the data returned from the L2 cache 16 or other storage location directly to the processor's associated registers (or placed temporarily in L1 data cache 20) for immediate use within the processor operations. In the preferred embodiment, the data from the load request is returned to the GPR or FPR rename register, i.e., the data is "written back," where it is made available for continuing processing by later instructions. Thus, the MS flag indicates the speculative nature of the load request in the LRQ 208 while the LSU 96 waits on the sync acknowledgment, but the data returned is made immediately available to the processor's execution units or registers before a sync ack is received by BOP controller 221. Thus, the previous "wait on sync ack" requirement before executing subsequent load instructions (and following instructions) is removed, and load operations and other operations following the load are speculatively executed by the processor before the sync ack is received at the LSU.

When the sync ack is finally received, the BOP controller messages the affiliated logic of the rename registers that the data is no longer speculative and the affiliated logic resets the speculation flags associated with all instructions that followed the sync and/or utilized the data from the speculative load. If the data exhibits incorrect dependency or a snoop invalidate returns, etc., the data and later values are discarded from the rename registers and the corresponding instructions are re-executed.

FIG. 4 illustrates a sample rename register s according to one embodiment of the invention. Rename register 400 is illustrated having 80 possible register entries 403. Rename register 400 includes a speculation flag 401, which identifies when the result stored within register entries 403 follows a yet-to-be completed barrier operation (i.e., are speculative). Rename register 400 also includes a GPR (FPR) number 405 associated with each register entry 403. GPR (FPR) number 405 indicates which entry of general purpose register 84, 86 (or FPR 88) the value stored in register entry 403 is assigned to when speculative flag 401 has a reset or off code. In a preferred embodiment, rename register 400 has an affiliated logic that receives messages from BOP controller 221 and sets/resets flag 401 for stored values accordingly.

Thus, when the data is initially returned and placed in the rename register 400, the affiliated logic sets the specific bit 401 to indicate that the data is speculative. Subsequent instructions that may have already been placed in the issue queues are monitored and the resulting values placed in the rename registers 400 are flagged (i.e., the bit 401 is set) by affiliated logic. In one embodiment, the affiliated logic may also set the bits within the issue queues of the instructions or the bits of the IISA instructions along with the bits 401 of the rename registers in which the resulting values are placed.

A sample instruction sequence with which the features of the present invention may advantageously be utilized is as follows:

A store addr(GPR30), data(GPR31)
B load addr(GRR6), data(GPR18)
C sync
D load addr(GRR17), data(GPR12)
E addition GPR18, x'0001'→GPR(20)
F addition GPR12, x'0002'→GPR(14)
G store addr(GPR5), data(GPR20)
H store addr(GPR4), data(GPR14)
I store addr(GPR1), data(GPR29)
J XOR GPR18, GPR12→GPR27
K branch to L if GPR27=X'0000', else go to Y
L addition GPR18, x'0001'→GPR21
M addition GPR12, x'0002'→GPR15
N store addr(GPR3), data(GPR21)
O store addr(GPR2), data(GPR15)
P sync
Q load addr(GPR8), data(GPR22)
R addition GPR22, x'0003'→GPR23
.
.
.
.
Y (another set of instructions)
.
.
.

Figure 5:
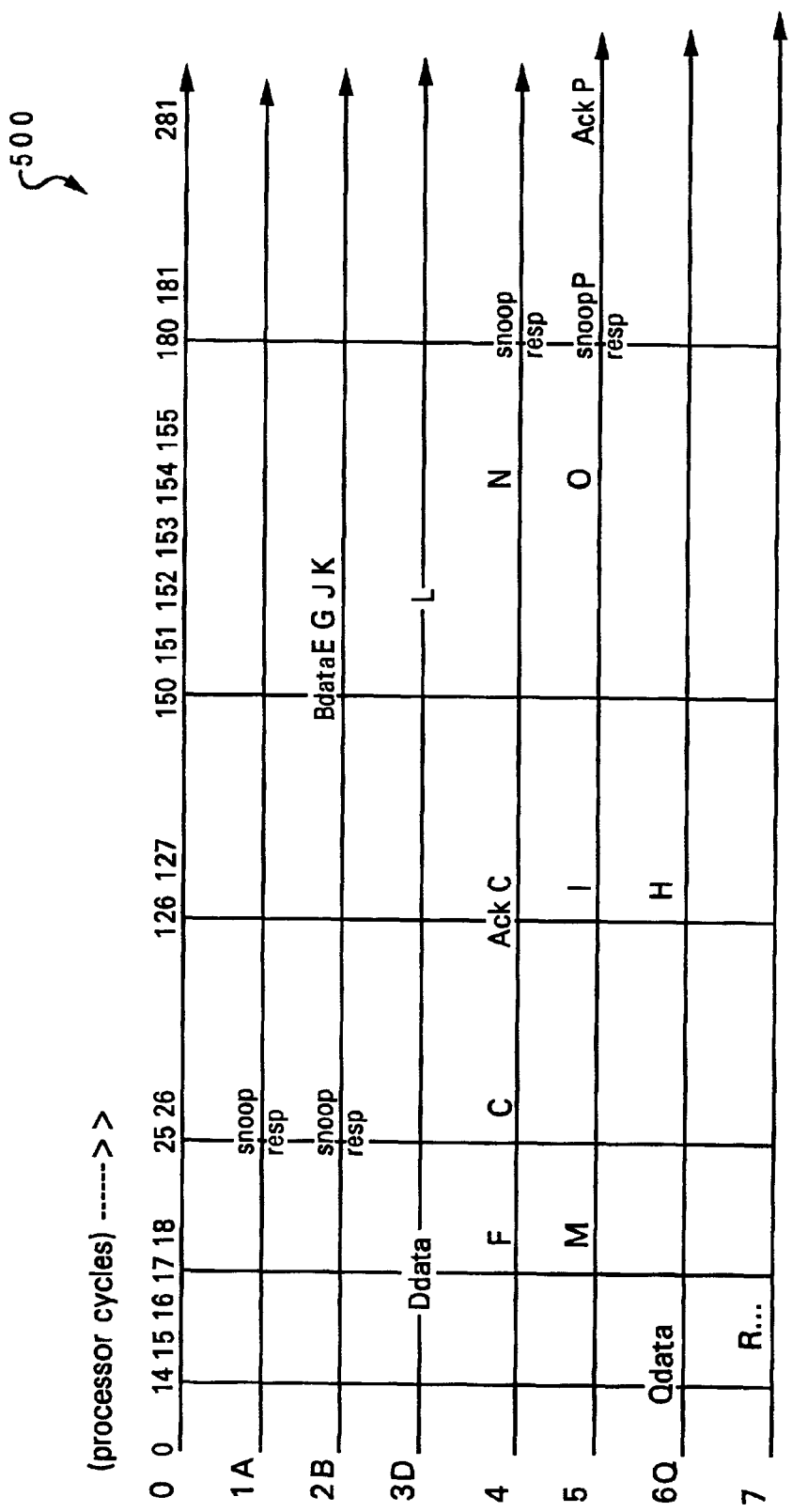
FIG. 5 is a timing diagram illustrating processor cycles and instruction processing with full speculative execution in accordance with a preferred embodiment of the present invention.

Referring now to FIG. 5, there is illustrated a timing diagram 500 for execution of the above sample instruction sequence (A–R) with full processor speculation as provided by the present invention. Eight time lines are provided, numbered 0–7, representing the total number of simultaneous operations possible within the processor. The actual time is provided as processor cycles and counted at line 0. Cycle 0 indicates start of processing for the above instruction sequence and cycle 281 indicates the time the last operation of the sequence completes.

At time 0, instruction A, B, D, and Q are executed. According to the instruction sequence, instruction D is launched prior to a preceding sync, and instruction Q is launch prior to two preceding syncs and a branch instruction. Instruction D thus exhibits a first level barrier speculation and has one associated barrier flag set. Instruction Q, however, exhibits a second level barrier speculation as well as a first level branch speculation. Thus instruction Q may have three corresponding speculation flags set, depending on the specific implementation of the invention utilized.

Data requested by instruction Q (Q data) returns at time 14, and instruction R and subsequent instructions, which utilizes Q data, commence execution at time 15. D data returns at time 17 cycles and instructions F and M, which utilizes D data, are executed at time 18 cycles. Thus, F is speculatively executed with respect to a barrier speculation, and M is speculatively executed with respect to both a barrier speculation and a branch speculation and corresponding speculation flags are set for both instructions.

In operation, sync instructions are typically not executed until after a previous snoop on the bus completes. Thus, sync instruction C is executed at time 26 after a snoop response is received for instructions A and B at time 25. An acknowledgment is received for sync instruction C 100 cycles later at time 126. In the illustrated embodiments, sync operations requires about 100 processor cycles to complete in a 1 GHz SMP system.

Once the sync ack returns, store instructions I and H are executed at time 127. At time 150 cycles, B data returns. Following, all instructions that depend on B data, i.e., instructions E, G, J and K, are executed in sequential order. Differences in the return time of data, e.g., B data and D data, may depend on which level of memory the data is located. Instruction D (load request) may may have hit at L2 cache, while instruction B hit at lower level memory, resulting in a much longer response time.

Instruction L is speculatively executed at time 153, prior to branch instruction K being resolved at time 154 cycle. Following, at time 155, instructions N and O are issued. Following the return of the snoop responses for instructions N and O at time 180, sync instruction P is issued. Associated sync ack then returns at time 281.

Thus, as illustrated with the above examples, with full processor speculation, all subsequent instructions may be processed/executed immediately upon return of the load data before a preceding sync is even issued on the bus and/or before the sync ack returns. Present SMP commercial workloads exhibit correct "sync" speculation for greater than 99% of the operations across groups of instructions. Accordingly, if the speculative load is correct, i.e., data dependencies were observed, then a significant performance benefit may be achieved.

Figure 3:
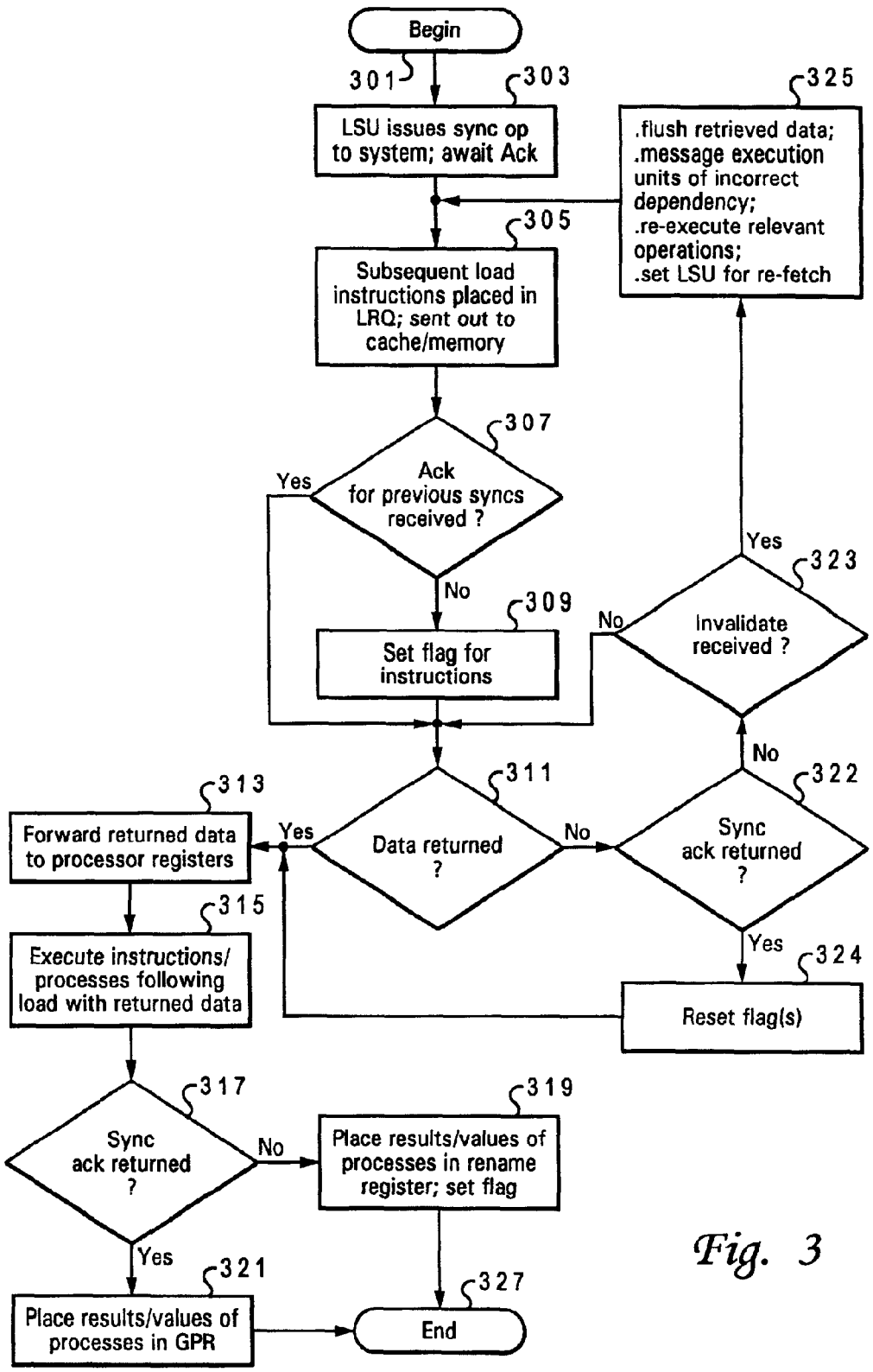
FIG. 3 is a logic flow chart that illustrates the process of speculatively executing load instructions and subsequent instructions beyond syncs in accordance with the present invention.

FIG. 3 illustrates the process by which speculative issuance of load instructions and subsequent operations are completed beyond issued barrier operations. As described above, the process involves barrier operation controller 221 setting MS flags, which may comprise multiple-bit registers or MS group flags. The process begins at block 301 and thereafter proceeds to block 303, where LSU 201 issues a sync operation on the system bus 14 and waits on a sync ack. Load dispatch control unit 205 places subsequent load requests in LRQ 208. A determination is made by BOP controller 221, at block 307, whether any previously issued syncs operation have not completed on system bus 14. When there are outstanding sync acks, the BOP controller 205 sets the flags of the load requests at block 309 to indicate that the loads are speculative. LRQ 208 then issues the load requests at block 309 to the cache and memory hierarchy.

A determination is made at block 311 whether or not data returned to LSU 201 from L1 data cache 20, L2 cache 16, or memory 12. If data returned, then LSU 201 immediately forwards the data to processor registers or execution units at block 311, where the data may be utilized by instructions following the load in the instruction sequence. Once data arrives in processor registers, subsequent instructions that require the data are executed as illustrated in block 315. Resulting values of the subsequent operations are generated and a determination is made at block 317 whether a sync ack has been received. If a sync ack has been received, then the values are placed into the GPR or FPR registers (i.e., the bit 401 in rename register 400 is not set as speculative) as illustrated in block 321. If no sync ack has been received, however, the values are placed into rename registers 400 and affiliated logic sets the bits to indicate that the values are speculative at block 319. Then the process ends at block 327.

Returning to decision block 311, the BOP controller 221 continues to monitor for the receipt of the sync ack at block 322. If the sync ack has not been received, then a determination is made at block 323 whether the LSU 201 receives an invalidate. If an invalidate is received, then BOP controller 221 causes LRQ 205 to reissue the load request from the LRQ at block 325. Also, at block 325, BOP controller 221 messages the processor's execution units that any data previously provided by the load request is incorrect. The processor logic then handles correction of the operations that utilized the incorrect data. The correction may entail messaging the particular execution unit to which the data was provided to not utilize the data, removing the data and/or results from the respective register(s), and re-executing all operations affected by the incorrect data at block 315. When the sync ack is received, all speculative flags (or bits) are reset as shown in block 323, values stored in the rename register become the values of corresponding GRPs and/or FPRs, and the processor continues execution of the instruction processes.

In the preferred embodiment of the invention, the speculative load functionality may be embedded within speculative branch prediction paths or vice-versa as indicated within the instruction sequence provided above. For example, the instruction sequence may contain branch within a speculative load instruction path, speculative loads within a branch, and multi-sync load speculation. With branch prediction, when the load data maintains correct dependency, substantial amounts of processing of the instruction sequence in the branch path is allowed to complete, resulting in faster processor operation. Thus, LRQ 208 continues to issue subsequent load requests, albeit speculatively, while waiting for both the sync acks and the determination of the correctness of the branch path. In the preferred implementation, both the load request and the speculative branch instructions have an associated bit(s) to identify to the processor's execution units that the instructions are speculatively executed and data are speculatively provided.

In one embodiment, the architecture of the IISA includes an appended bit or group of bits that are utilized to track the speculative nature of the instruction. The bit is provided a default value, for example, "0" that indicates that the instruction is not speculative. A next value, e.g., "1" then indicates that the instruction is speculative. The setting of the value of the bit is controlled by speculative flag controller 160.

Also, a multiple bit embodiment is provided. Within an embedded speculatively executed branch path, a two bit flag may be set to 01 for a first load instruction and 11 for a second load instruction. The least significant digit "1" in each case represents that the particular instruction is a speculative load, while the most significant digit "0" and "1", respectively, indicates whether the load is being completed within a speculative branch Thus, the first load instruction is not speculated within a speculative branch path, and the second load instruction is speculated within a speculative branch path. Alternatively, a speculative load within a speculative instruction sequence that is not a speculative branch path may utilize a similar multiple bit code.

In one preferred embodiment, the logic that controls instruction dispatching sets and controls a speculative bit of the IISA instruction to indicate that the instructions is speculatively issued following a yet-to-be completed barrier operation.

In a next embodiment, the bit or bits are localized within the queue associated with a particular speculatively executed instruction. Thus, each issue queue 62, 64, 66, 68, 70 and 72 may comprise setable bits associated with each line of the queue and associated logic that sets and resets the bits to indicate whether the instruction is speculatively executed. The speculative bit may be set to a "1" or "0" to indicate whether or not the instruction is speculatively executed.

The present invention eliminates all throttling of the processor except for instances when throttling is absolutely necessary, such as to maintain correct data dependencies. Because the present processor architectures are designed with relatively deep queues, evaluating the correctness of the speculation occurs prior to the queue being filled and the data being committed to the processor's GPRs/FPRs, and the instructions may be re-issued from the queues without difficulty.

The present invention provides a new processor architecture (and method), which allows continuous issuing and execution of instructions, e.g., load instructions and subsequent instructions that may require the load data beyond a barrier operation in an instruction sequence. The processors utilized within the invention preferably provides greater than 99% accuracy with instructions executed beyond a sync as less than 1% of the data exhibit dependency on the prior execution of a previously issued instruction. The invention takes advantage of the high accuracy percentages within modern high frequency, mutiprocessor architectures to implement full-processor speculation, which removes previous holds on forward processing due to resolution of processor speculation (if any) and results in increased overall processing speeds.

While illustrative embodiments have been particularly shown and described, it will be understood by those skilled in the art that various changes in form and detail may be made therein without departing from the spirit and scope of the illustrative embodiments.

What is claimed is:

1. A method for speculation of instruction processing in a multiprocessor data processing system comprising:

issuing from a processor a barrier operation on a system bus of said data processing system;

speculatively executing operations associated with instructions sequentially following said barrier operation in an instruction sequence prior to completion of said barrier operation, wherein operations are speculatively executed relative to a preceding barrier operation whenever the preceding barrier operation has not yet completed; and immediately forwarding data returned by a load instruction among said instructions sequentially following said barrier operation to execution units of said processor, wherein said data is utilized within said operations, where necessary, regardless of a completion status of said barrier operation, wherein further, said operations and results/data generated by said operations are tagged as barrier-speculative when said operations are speculatively executed relative to the barrier operation.

2. The method of claim 1, wherein said executing step further comprises:
issuing a load request for data;
responsive to a return of said data, immediately forwarding said data to a register of said processor; and
providing said data to subsequent processes that utilize said data.

3. The method of claim 2, wherein tagging of processes and results/data includes: setting a flag within said register when said barrier operation has not yet completed, wherein said flag indicates that said load instruction, returned data and each instruction executed and each result generated by said subsequent processes and stored within said register is barrier-speculative, pending a completion of said barrier operation.

4. The method of claim 3, further comprising:
monitoring for said completion of said barrier operation without an invalidate response or incorrect dependency;
responsive to said completion, resetting said flag, wherein said register is no longer tagged as barrier-speculative and said processes are allowed to continue executing as non-speculative;
when the data exhibits incorrect dependency or an invalidate response is received, discarding the data and other values from the registers dependent on the data and re-executing each corresponding operation.

5. The method of claim 4, wherein further, when an invalidate is received prior to said completion, said processor discards said data and each of said results from said register.

6. The method of claim 5, wherein said operations include load requests and branch instructions, and wherein further said method provides embedded branch speculation within said operations and speculative load request, relative to a preceding barrier operation issued within a branch path.

7. The method of claim 6, further comprising:
setting a first bit within said register to indicate said load operation is being issued within a speculative branch; and
setting a second bit within said register to indicate that said load operation is being issued speculatively, relative to a preceding barrier operation within the speculative branch.

8. A multiprocessor computer system comprising:
a plurality of processors interconnected by a system bus, wherein said processors including a first processor that speculatively issues load requests and speculatively processes subsequent instructions utilizing data retained by said load request before a completion of a barrier operation that is issued sequentially before said load requests and subsequent instructions, wherein said load request is speculatively issued and said subsequent instructions is speculatively processed relative to the barrier operation such that the speculative issuance and speculative processing are barrier-speculative;
wherein said first processor further comprises:
execution units that processes instructions that utilize said data when said data is placed in said register; and
logic, affiliated with said register, that sets a flag within said register when a value resulting from executing said instructions is placed in said register prior to said completion, wherein said flag messages to the execution units that said instruction and said results are barrier-speculative, pending a completion of said barrier operation; and
a memory hierarchy connected to said plurality of processors via said system bus that sources said data.

9. The multiprocessor computer system of claim 8, wherein said first processor comprises a load/store unit with logic that controls issuing of load and store instructions before completion of a preceding barrier operation to provide said data to a register of said first processor prior to a return of an acknowledgment for said preceding barrier operations.

10. The multiprocessor computer system of claim 8, wherein said logic further:
resets said flag responsive to said completion; and
when the data exhibits incorrect dependency or an invalidate response is received, discarding the data and other values from the registers dependent on the data and re-executing each corresponding operation.

11. The multiprocessor computer system of claim 10, wherein said first processor further comprises a plurality of execution queues and logic for setting a bit associated with an entry of said queues to indicate whether an instruction placed in said entry is speculative with respect to said barrier operation.

12. The multiprocessor computer system of claim 10, wherein said first processor further comprises a plurality of execution queues and logic for setting a bit associated with an entry of said queues to indicate whether an instruction placed in said entry is speculative with respect to an unresolved branch instruction that precedes said instruction in said instruction sequence.

13. A processor comprising:
a plurality of execution units including a load/store unit, wherein said load/store unit speculatively executes load requests and other instructions before completion of a barrier operation that precedes said load requests and other instructions in an instruction sequence;
a rename register that includes a plurality of entries, wherein each entry has a barrier-speculation flag and an associated general purpose register identifier; and
logic for setting said barrier-speculation flag to indicate when a value stored in said entry is speculative, relative to completion of said barrier operation.

14. The processor of claim 13, wherein said load/store unit provides data returned by said load requests immediately to an entry of said rename register for utilization within subsequent processes that require said data.

15. The processor of claim 13, wherein:
said load/store unit messages said execution units and said logic when said barrier operation completes; and
said logic, responsive to a receipt of a message indicating successful completion of said barrier operation, resets each flag associated with a register entry that was speculative with respect to said barrier operation.

16. The processor of claim 13, further comprising:
a plurality of issue queues associated with said execution units in which instructions to be executed are placed; and logic for indicating that a particular instruction within one of said issue queues is speculative with respect to the barrier operation.

17. The processor of claim 16, further comprising:

an enhanced internal instruction set architecture that includes a settable bit, which indicates whether an instruction is speculative, wherein said logic sets said settable bit responsive to whether said barrier operation has completed; and when said barrier operation has completed, said logic resets said bit.

18. The processor of claim 16, wherein said issue queues include a speculation bit associated with each entry location; wherein said speculation bit is set by said logic when said particular instruction is placed in an associated entry location, and reset only when said barrier operation has successfully completed.

19. The processor of claim 13, further comprising:

a plurality of issue queues associated with said execution units in which instructions to be executed are placed; and logic for indicating that a particular instruction within one of said issue queues is speculative with respect to an unresolved branch instruction that precedes said instruction within said instruction sequence.

20. A data processing system comprising:

a memory; and at least two processors interconnected to each other and said memory via a system bus, wherein a first processor comprises:

a plurality of execution units including a load/store unit, wherein said load/store unit speculatively executes load requests and other instructions before completion of a barrier operation that precedes said load requests and other instructions in an instruction sequence;

a rename register that includes a plurality of entries, wherein each entry has a barrier-speculation flag and an associated general purpose register identifier; and logic for setting said barrier-speculation flag to indicate when a value stored in said entry is speculative, relative to completion of said barrier operation.

21. The data processing system of claim 20, wherein said load/store unit provides data returned by said load requests immediately to an execution unit of said processor for utilization within subsequent processes that require said data, wherein results generated by said subsequent processes are also tagged as barrier-speculative when said processes complete prior to completion of said barrier operation.

22. The data processing system of claim 21, wherein:

said load/store unit messages said execution units and said logic when said barrier operation completes; and said logic, responsive to a receipt of a message indicating successful completion of said barrier operation, resets each flag associated with a register entry that was speculative with respect to said barrier operation.

23. The data processing system of claim 22, further comprising:

a plurality of issue queues associated with said execution units in which instructions to be executed are placed; and logic for indicating that a particular instruction within one of said issue queues is speculative with respect to the barrier operation.

24. The data processing system of claim 23, further comprising:

an enhanced internal instruction set architecture that includes a settable bit, which indicates whether an instruction is speculative, wherein said logic sets said settable bit responsive to whether said barrier operation has completed; and when said barrier operation has completed, said logic resets said bit.

25. The data processing system of claim 23, wherein said issue queues includes a speculation bit associated with each entry location, wherein said speculation bit is set by said logic when said particular instruction is placed in an associated entry location, and reset only when said barrier operation has successfully completed.

26. A multiprocessor computer system comprising:

a plurality of processors interconnected by a system bus, wherein said processors including a first processor that speculatively issues load requests and speculatively processes subsequent instructions utilizing data returned by said load request before a completion of a barrier operation that is issued sequentially before said load requests and subsequent instructions, wherein said load request is speculatively issued and said subsequent instructions are speculatively processed relative to the barrier operation such that the speculative issuance and speculative processing are barrier-speculative;

wherein said first processor further comprises:

a branch processing unit that executes branch instructions within the sequence of instructions;

execution logic that speculatively selects a branch prior to resolution of a branch instruction, wherein, when said barrier operation is sequentially ahead of the load requests in execution sequence, said execution logic further includes:

means for providing barrier-speculation of said load request within the speculative branch path, wherein said load request is issued speculatively, relative to the preceding barrier operation, and within the speculative branch path;

wherein further said execution logic includes logic for:

setting a first bit within said register to indicate said load operation is being issued within a speculative branch; and setting a second bit within said register to indicate that said load operation is being issued speculatively, relative to a preceding barrier operation and within the speculative branch; and a memory hierarchy connected to said plurality of processors via said system bus that sources said data.

* * * * *